E. R. CALTHROP.
PARACHUTE.
APPLICATION FILED APR. 14, 1914.

1,213,332.

Patented Jan. 23, 1917.
8 SHEETS—SHEET 1.

Everard Richard Calthrop,
Inventor,

By Lawrence Langner
Attorney.

Witnesses:—
H Langner
V. Belletti

E. R. CALTHROP.
PARACHUTE.
APPLICATION FILED APR. 14, 1914.

1,213,332.

Patented Jan. 23, 1917.
8 SHEETS—SHEET 7.

Witnesses,

Everard Richard Calthrop,
Inventor.
by
Attorney

E. R. CALTHROP.
PARACHUTE.
APPLICATION FILED APR. 14, 1914.

1,213,332.

Patented Jan. 23, 1917.
8 SHEETS—SHEET 8.

Witnesses,

Everard Richard Calthrop,
Inventor,
by
Attorney,

UNITED STATES PATENT OFFICE.

EVERARD RICHARD CALTHROP, OF LONDON, ENGLAND.

PARACHUTE.

1,213,332.  Specification of Letters Patent.  Patented Jan. 23, 1917.

Application filed April 14, 1914. Serial No. 831,785.

*To all whom it may concern:*

Be it known that I, EVERARD RICHARD CALTHROP, a subject of the King of Great Britain, residing at London, in the county of Middlesex, England, have invented new and useful Improvements in and Relating to Parachutes, of which the following is a specification.

My invention has reference to parachutes and like life saving appliances and is more particularly designed for use with aeroplanes air ships and like craft to provide a ready and efficient means whereby the pilot or aeronaut may descend safely to the ground when necessary as in the event of an accident to the aeroplane or air ship or which may be employed for dropping a passenger with messages photo films or otherwise communicating intelligence as in the time of war.

More particularly the invention has reference to parachutes of the kind wherein a fluid under pressure such as compressed air is introduced to the cover to assist in positively expanding it either by conducting the compressed fluid through telescopic or other tubes into a collapsible tubular framework carried by the cover or by folding the parachute within a housing to which compressed air is admitted to project the parachute into operative position.

The primary object of the present invention is to provide improvements in parachutes of the aforesaid kind which shall be simple in construction efficient in use and prompt and certain in operation so that in case of emergency the parachute may be instantly expanded clear of a damaged or falling aeroplane or instantly expanded and released from an air ship or the like thus avoiding the uncertainties and limitations of the initial drop before expanding of an ordinary parachute.

A further object of the invention is to provide an improved arrangement of collapsible tubular framework into which a fluid stored under pressure in a reservoir carried on the aircraft may be admitted to positively expand the parachute cover and improved means for connecting said framework and parachute cover in such a manner as to admit of limited relative movement between them so that when the tubular framework is extended it will automatically take up its correct position in or on the cover of the parachute without strangulation of any part of the tubular construction.

Among the further objects of the invention are: to provide improved means for introducing the fluid under pressure to the interior of the parachute; to provide improved means for nesting a parachute in a "nest" or box and for ejecting it clear of the aeroplane or the like; to provide means whereby all danger of the ropes and cover of the parachute becoming entangled will be obviated; to provide a construction wherein the parachute may be instantly released and expanded when emergency arises by means under the control of the aviator; to provide improved means whereby the pipe or pipes for supplying the compressed fluid to the parachute may be automatically severed or disconnected from the reservoir containing the compressed fluid when the parachute is expanded, and to provide improved means whereby an expanded parachute and a passenger may be detached from an air ship or balloon either by those in the car of the air ship or balloon or by the actuation of releasing means under the control of the passenger.

The aforementioned and other objects as may hereinafter appear or are incidental to my invention are attained by the means which I will now proceed to describe in detail for which purpose I shall refer to the accompanying drawings in which:

Fig. 7 is another view of the valve but shown reversed in the head of the parachute to adapt the latter for use with an airship or the like. Fig. 10 is a modified form of releasing means hereinafter more particularly referred to.

Figure 1:
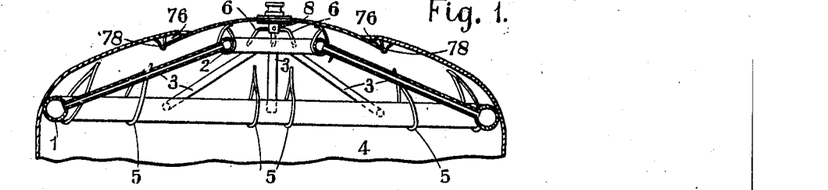
Figure 1 is a sectional view of the cover of a parachute suitable for releasing from an air ship or balloon and illustrating the arrangement of the collapsible tubular framework under this invention.
Figure 2:
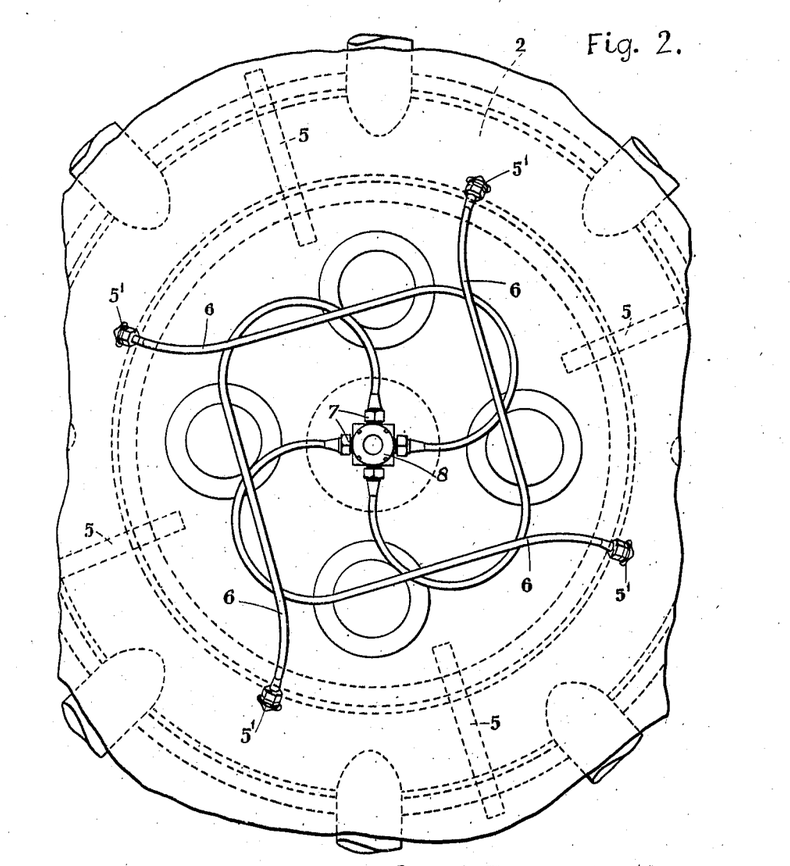
Fig. 2 is a plan view of the head of a parachute but showing the tubes for supplying compressed air from the valve to the tubular framework as located outside the cover instead of inside as in Fig. 1.

Referring now to Figs. 1 and 2 the collapsible tubular framework consists of annular tubes 1 and 2 connected by the tubes 3. Said tubes are constructed of material substantially impervious to and capable of resisting a considerable pressure of air or other fluid to which end I may employ finely woven rubbered canvas or they may consist of rubber tubes inclosed in a rubbered canvas sleeve or casing the edges of said casing being cemented stitched or laced together as may be found most desirable or convenient. The tubular framework is loosely secured to the underside of the parachute cover 4 as shown in Figs. 1 and 2 by means of the slings or straps 5 whereby limited relative movement between the framework and cover of the parachute will be permitted.

Connected to the annular tube 2 such as by means 5' are the pipes 6 for admitting the compressed air or other fluid under pressure said pipes being attached at 7 to the valve 8 mounted in the head or nose of the parachute.

Figure 3:
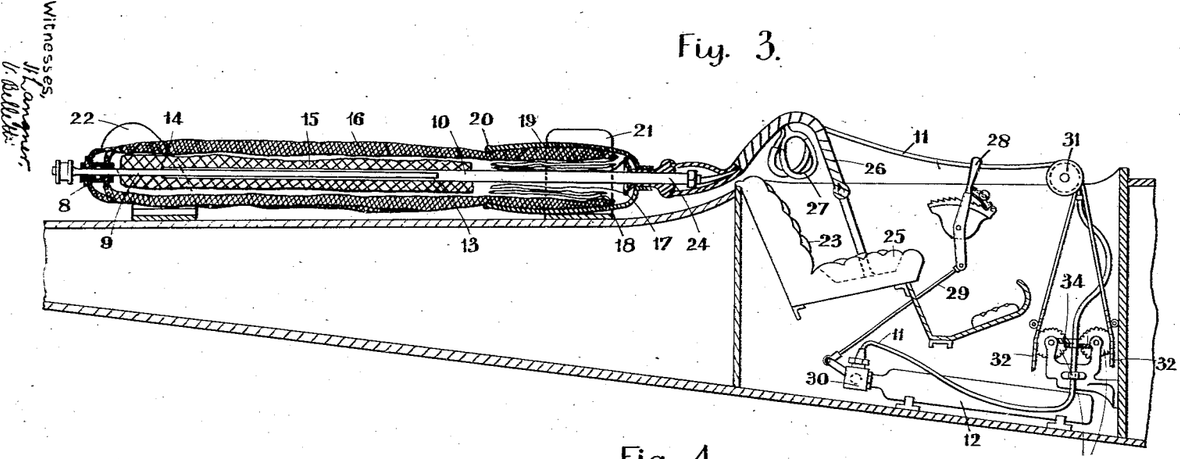
Fig. 3 is an elevation parts being shown in section of a parachute in accordance with this invention mounted in position upon an aeroplane and showing one means of positively expanding it.

In the particular construction shown in Fig. 3 the parachute is provided with a central stem comprising two telescopic tubular members 9 and 10 the tube 9 being connected directly to the valve 8 in the head of the parachute and the tube 10 by means of the pipe 11 to a compressed air reservoir 12 mounted in an appropriate position upon the flying machine.

The tubes 9 and 10 are so constructed that when extended to their full length the end 13 of tube 9 and the end 14 of the tube 10 form a substantially tight joint so that when air is admitted to the tube 10 from the reservoir 12 as will presently be explained it escapes at 14 to the interior of the parachute unplaiting and partially expanding it which operation serves to extend the telescopic stem until the tubes reach the limit of their travel when they are automatically locked as by the provision of a spring snap or other device. The air thus being prevented from escaping at 14 will now flow through tube 9 to the valve 8 through which it passes to the collapsible tubular framework thereby inflating it to positively expand the parachute. Preferably the stem is surrounded with a light wire cage 15 to hold the plaited portions 16 of the parachute cover away from the stem whereby the air is allowed more ready access to the interior to effect the preliminary inflation above described.

The parachute cover is secured to the ring 17 by the guy ropes 18 which lead down radially from the cover and said guy ropes are folded back and forth within the mouth of the plaited cover as will be clearly seen on reference to Fig. 3. An elastic shield 19 is provided to envelop the mouth of the folded parachute being normally retained in position by the thickened elastic lip or ring 20 with which it is provided. The purpose of said shield is to prevent the external air obtaining access to the interior of the parachute during normal flight of the aeroplane and further to prevent the compressed air when admitted from expanding the parachute from escaping until such time as the internal air pressure is sufficient to overcome the resistance of the elastic shield when the edge of the cover 4 and the guy ropes 18 will be freed by the shield thus allowing the more full expansion of the cover.

It will be seen that the parachute folded or plaited around its central stem rests freely in and is supported horizontally by the fore and aft brackets 21 and 22 carried by the fuselage of the aeroplane at the rear of the pilot's seat 23. The ring 17 preferably forms part of a member 24 to which the parachute seat 25 is securely attached by the harness 26 said harness including the arm loops 27 for the pilot. The seat 25 is preferably arranged to fit a recess in the aeroplane seat 23 so that the aeronaut upon taking his place in the pilot's seat and passing his arms through the loops 27 shall be ready in any emergency to detach himself and the parachute from the flying machine without any preparation other than the single act of operating the mechanism to release the air from the reservoir 12. One means for effecting this release will now be described. Mounted on the frame of the machine and within convenient reach of the pilot is an operating lever 28 connected by the rod 29 with the air valve 30 serving to admit air under pressure from the reservoir 12 to the pipe 11 through which it flows to the tubular stem 10 escaping at 14 to the interior of the parachute. As the air collects in the interior of the cover the parachute is partially expanded the tube 9 of the stem being thus drawn out to its fullest extent when it becomes automatically locked to the end 14 of the tube 10. The air being thus shut off at the point 14 will now flow at full pressure through the tube 9 to the valve 8 through which it passes to the annular and radial tubes 1, 2 and 3. As this occurs the folded mouth of the parachute is stripped from the elastic shield 19 and the cover will be positively expanded to its largest diameter. The shock incidental to the opening of the parachute and its consequent assumption of the load of the pilot draws that portion of the air pipe 11 situated between the loops 27 and the pulley 31 taut and also draws upward the chains 32 which are in gear with sprocket wheels 33 thereby rotating said sprocket wheels to actuate the eccentrically mounted cutting shears 34 which are thus forced together to sever the pipe 11 and so entirely separating the pilot and the parachute from the damaged flying machine.

Figure 4:
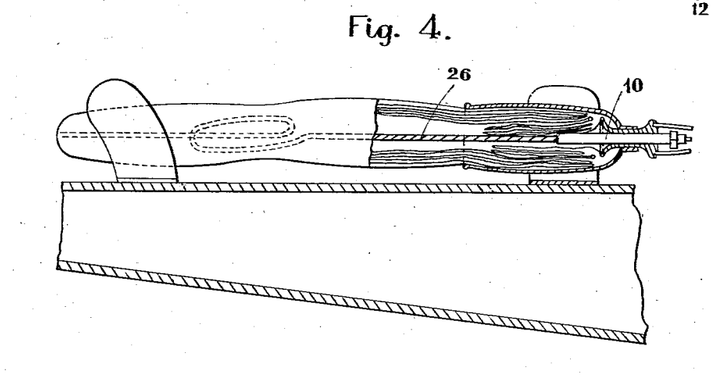
Fig. 4 illustrates a modification of the parachute shown in Fig. 3.

A somewhat modified construction of parachute is shown in Fig. 4 in which the central telescopic stem and collapsible tubular framework described with reference to Figs. 1 and 3 is dispensed with and the air from the reservoir 12 is introduced directly into the interior of the parachute cover through the tube 10 which is carried only so far into the interior of the cover as is necessary to effectively introduce the air therein. The rope 26 is continued through the middle of the cover and is made fast to the head or nose of the parachute.

Figure 5:
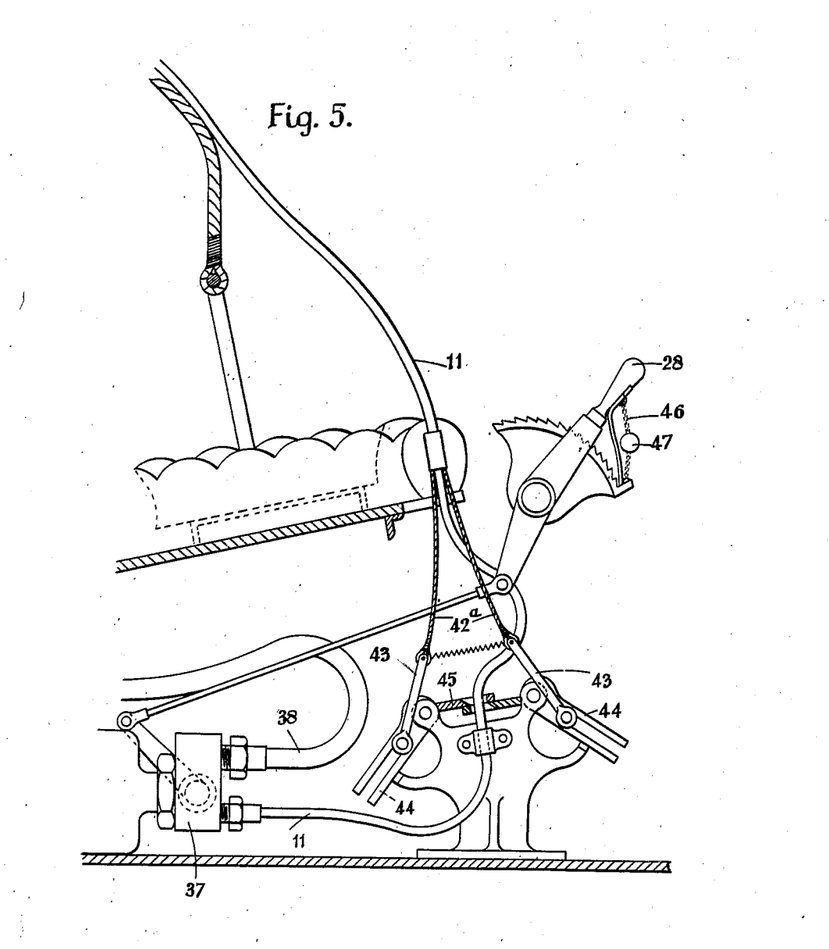
Figs. 5 and 5ᵃ are two sections of a view partly in section and partly in elevation of a somewhat modified construction under this invention.
Figure 5A:
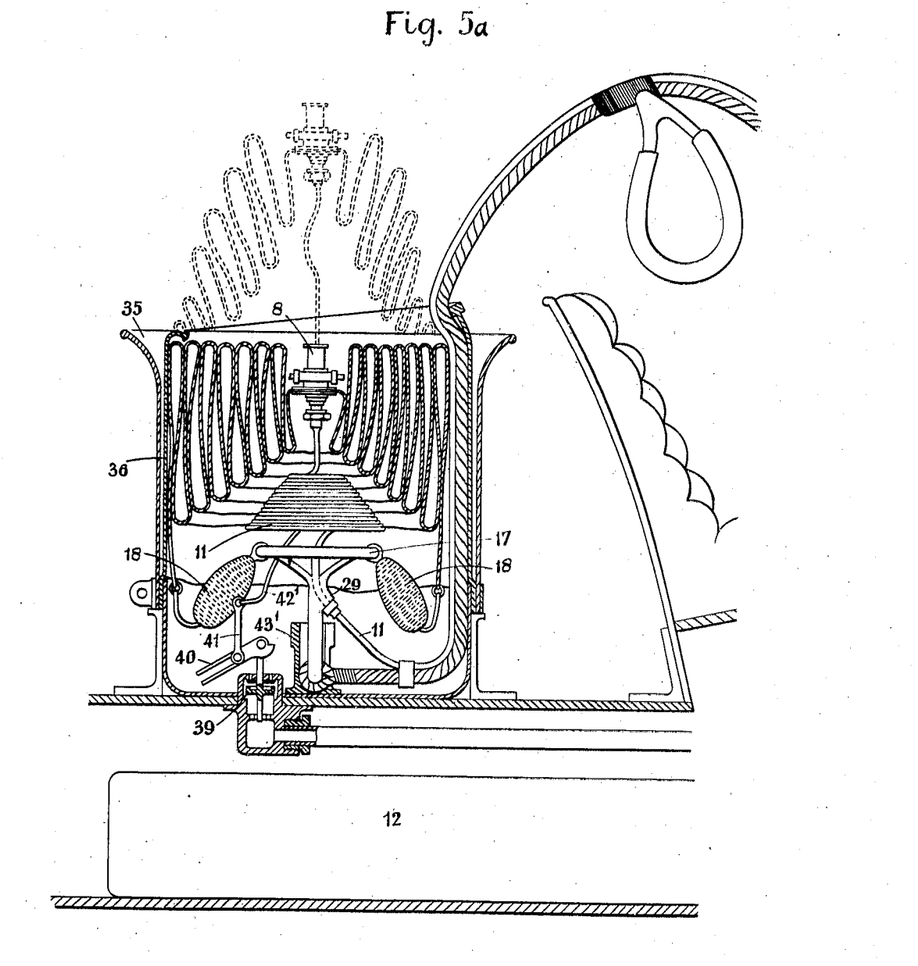

In Figs. 5 and 5ª I have illustrated means whereby the parachute may in case of emergency be instantly projected clear of the aeroplane and expanded. In this construction the parachute is not provided with a central stem the compressed air being fed directly to the valve 8 and tubular framework by the air pipe 11. The parachute is snugly nested in a box or casing 35 mounted on the fuselage of the air craft in such a manner as to permit it to unfold and expand without danger of any of the parts thereof, or the guy ropes becoming entangled or otherwise obstructing the positive expansion of the cover when projected from the box. To this end that portion of the air pipe 11 within the box 35 is coiled as shown and may be inclosed in a thin rubber or other envelop capable of being readily ruptured as the pipe uncoils. The guy ropes 18 are similarly coiled and enveloped for a like purpose. The air reservoir 12 is provided with a valve 37 controlled by the operating handle 28 whereby air under pressure may be simultaneously admitted through the large bore pipe 38 and valve 39 to the box 35 and through the smaller bore pipe 11 to the tubular framework carried by the parachute cover. The valve 39 is normally held open and the stem is connected to an open ended slotted lever 40 engaged by the link 41 which is attached by a cord 42' to the air pipe 11.

In order that all the parts liable to become entangled may be held in such a position that the danger of entanglement may be reduced to a minimum I provide a cradle or seating 43' preferably of rubber which is sufficiently rigid to hold the member 24 and its associated parts in a vertical position until all the ropes and the tube 11 are uncoiled and then to allow the member 24 to slip freely out of the cradle 43' when the pull comes upon the guy ropes.

Upon the valve 37 being opened by pulling the handle 28 a large volume of air under pressure rushes through the pipe 38 and valve 39 to the interior of the box 35 instantaneously projecting the nested cover clear of the elastic envelop 36 the bottom edge of which is secured as shown to the nest box 35 while the upper peripheral edge is provided with a thickened portion which operates to frictionally retain the peripheral fold of the parachute until the air admitted to the box 35 blows out the parachute cover as shown in dotted lines. The length of cord 42' is so determined that as the edge of the parachute is projected clear of the box 35 it exerts a pull upon link 41 turning the lever 40 and allowing the valve 39 to be seated thus cutting off the supply of compressed air to the box 35 the end of the link 41 at this moment slipping free of the slotted lever 40. Simultaneously with these operations compressed air is being fed through the pipe 11 and valve 8 to the tubular framework of the cover so positively expanding the parachute which then assumes the load of the pilot as the pipe 11 becomes taut it exerts a pull upon the cords 42ª thereby operating the links 43 and open ended slotted levers 44 to project the shearing members 54 toward each other thus severing the air pipe 11 and allowing the flying machine to fall free of the parachute and the pilot suspended thereby.

Figure 12:
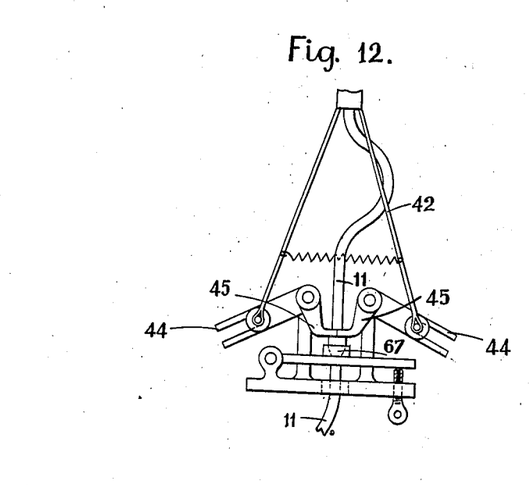
Figs. 12 and 13 are detail views.

Instead of severing the air pipe 11 by means of a shearing device as illustrated in Figs. 3 and 5 I may provide a "pull out" joint similar to that hereinafter described with reference to Fig. 7 and such a construction is illustrated in Fig. 12 wherein the slotted links 44 operated by the pull exerted on the ropes or the like 42 pull the levers 45 apart and so allow the joint 67 in the pipe 11 to be broken.

It will of course be understood that in the construction just described I may dispense with the tubular framework in a manner similar to that described with reference to Fig. 4 and utilize only the air pressure admitted to the box 35 to project the parachute clear thereof.

In Figs. 3 and 5 I have shown the operating handle 28 as mounted upon a toothed sector and having a pawl so arranged that the handle during normal operation can be moved only in one direction so that it cannot be inadvertently returned and so shut off the air supply. I have also shown a cord or chain 46 and seal 47 the unbroken condition of which indicates to the pilot that the mechanism has not been tampered with. The reservoir 12 may also be provided with a pressure gage for a like purpose.

Figure 6:
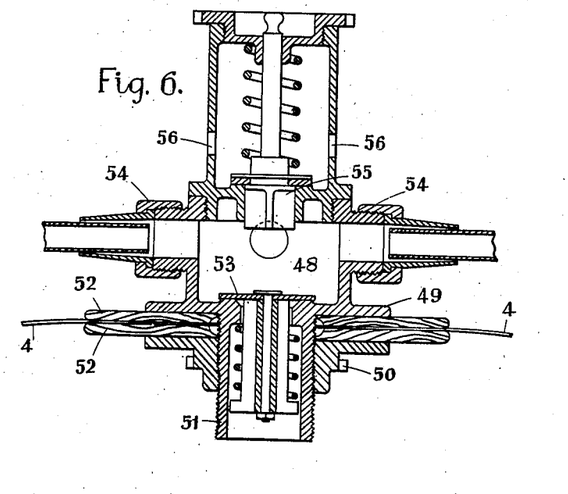
Fig. 6 represents a vertical section of the valve located on the head or nose of the parachute.

The construction of the valve 8 located in the head of the parachute will now be described for which purpose reference is to be had more particularly to Fig. 6.

The valve casing 48 is formed with a flange 49 between which and the internally screwed flanged nut 50 taking onto the threaded nipple 51 a pair of preferably three-ply wood washers 52 are arranged to securely clamp the material of which the cover 4 of the parachute is constructed to the valve.

In the interior of the casing 48 a spring controlled valve 53 is mounted adapted to open under the pressure of air admitted through the pipe 11 which is attached to the nipple 51. The casing 48 is also provided with four threaded nipples 54 serving for connection to the pipes 6 (Fig. 2) for supplying the compressed air to the annular tube 2. Detachably secured to the casing 48 is a relief valve 55 ports 56 being provided whereby any excess pressure in the pipes communicating with the valve may be discharged to the atmosphere.

The description of my invention so far has been confined to parachutes carried by an aeroplane or the like but the invention also contemplates the use of parachutes in connection with air ships or balloons in which case the device would be suspended from the car and the parachute expanded with the pilot seated before the parachute is separated from the air ship. In such circumstances it is necessary to introduce the compressed air to the tubular framework from the top of the head or nose of the parachute instead of from beneath as in the examples hereinbefore described and it is also necessary to provide means under the control either of the person in the car of the air ship or of the pilot in the seat of the parachute whereby the expanded parachute may be released.

The means which I prefer to adopt to attain these ends will now be described with particular reference to Figs. 7, 8, 9 and 10.

Figure 7:
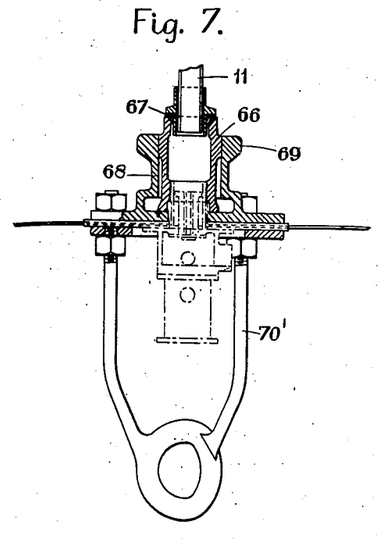

The valve 8 is reversed in the head of the parachute that is to say the nipple 51 projects upward—see Fig. 7—and to said nipple is screwed the long sleeved nut 66 in which is located a rubber joint 67 adapted for gas tight connection with the air supply pipe 11. Surrounding the nut 66 is an annular member 68 having a boss or flange 69 thereon the purpose of which will presently be explained. 70' (Fig. 7) indicates a shackle to which a rope 71 (Fig. 11) may be attached to support the weight of the passenger.

Figure 8:
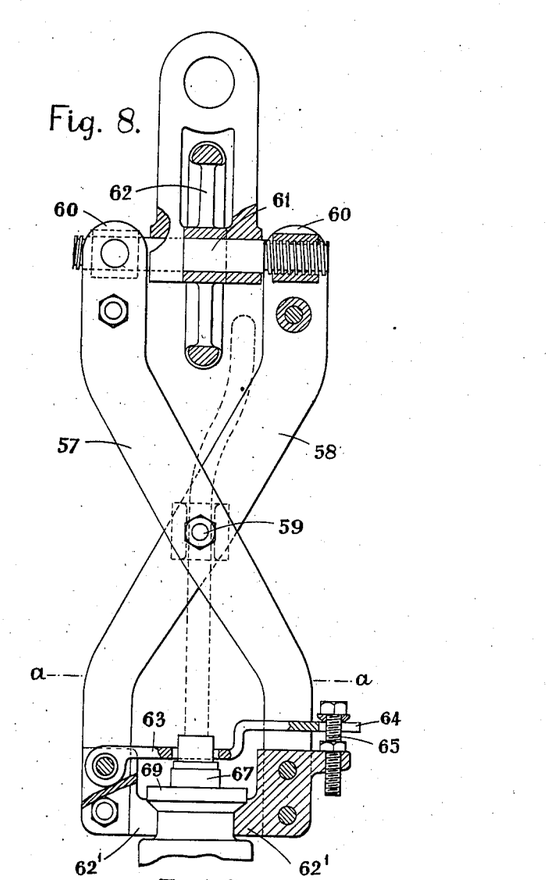
Fig. 8 illustrates a side elevation partly in section and Fig. 9 a sectional plan on line *a—a* of Fig. 8 of the mechanism for releasing an expanded parachute from an airship or balloon.
Figure 9:
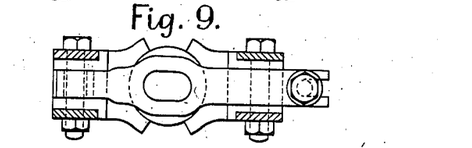

Slung in a readily-accessible position from the car is a releasing device the construction of which will be readily understood from Figs. 8 and 9. It comprises a pair of crossed levers 57 58 pivoted at 59 and having at their upper ends internally threaded trunnion blocks 60 in which a right and left hand screwed spindle 61 is engaged. Keyed to the spindle 61 is a hand wheel 62 by rotating which the levers 57 58 may be held together or forced apart. The lower ends of the levers are provided with forked members 62 adapted to embrace the boss 69 of the valve 8 projecting from the head of the parachute. A lever 63 having a slotted end 64 adapted to engage under a flange carried by the bolt 65 mounted on the cross lever 57 serves to hold the joint 67 normally in position.

Figure 11:
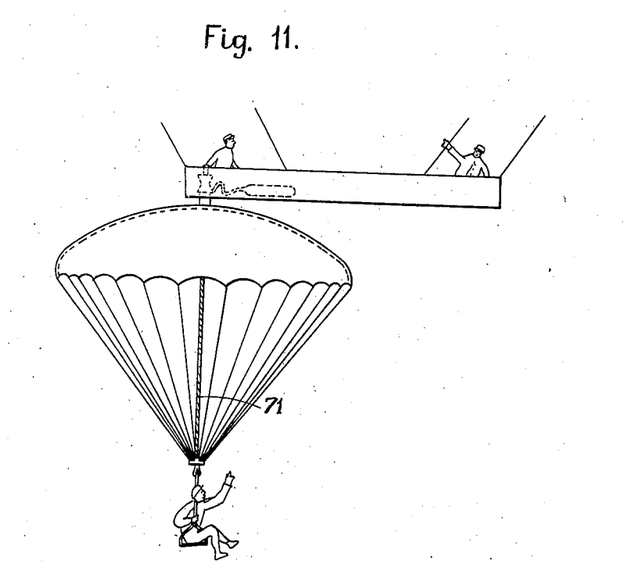
Fig. 11 is a view of the expanded parachute suspended from an air ship and preparatory to being released therefrom.

The passenger having taken his seat on the parachute thus suspended from the car compressed air is admitted to the tubular framework by opening a valve on the air reservoir thereby fully expanding the cover as shown in Fig. 11. By rotating the hand wheel 62 the ends of the levers will be forced apart disengaging the members 62 from the boss 69 and so releasing the parachute, the weight of which in falling pulls the joint 67 apart and so separates the valve 8 from the air supply pipe 11.

Figure 10:
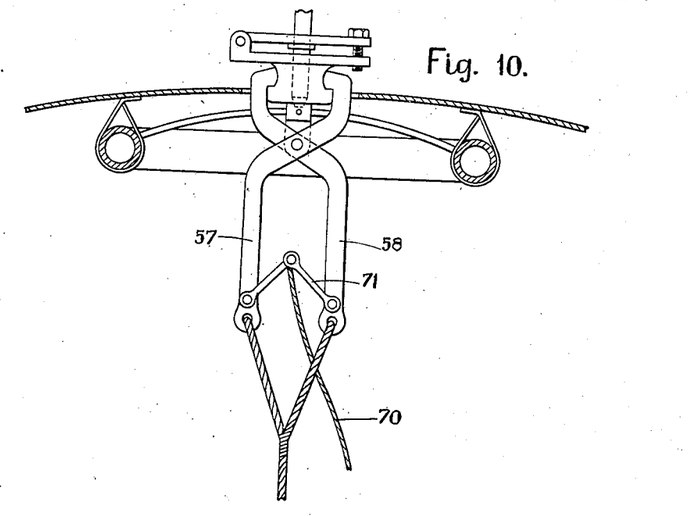

Fig. 10 illustrates a modified form of releasing device adapted to be operated by the passenger seated in the parachute. The construction is similar to that shown in Fig. 8 with the exception that the crossed levers 57 and 58 are separated by the passenger exerting a pull upon the rope 70 attached to a toggle joint 71. As the operation of this form of the device will be apparent from an inspection of the drawings I do not deem it necessary to append a detailed description thereof.

Figure 13:
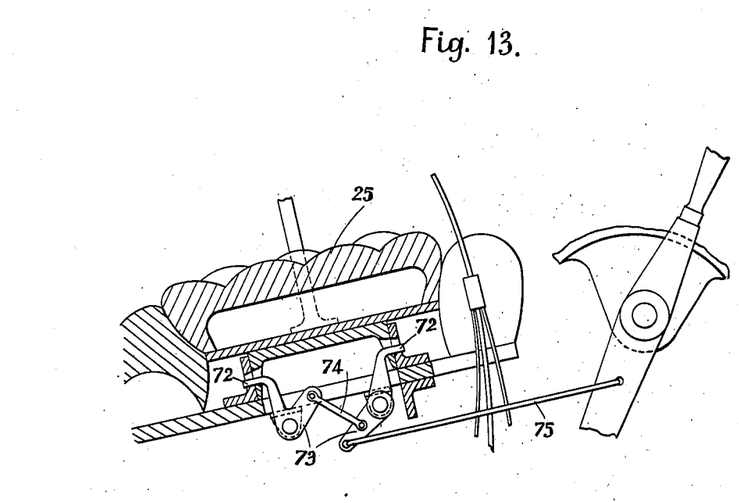

In cases where my improved parachute is to be employed in connection with aeroplanes where the pilot is strapped in, I may arrange the parachute seat (which as hereinbefore described fits into the permanent seat of the aeroplane) to be released when the lever controlling the air supply is pulled and I have illustrated one means of effecting this in Fig. 13. The parachute seat 25 is held by the bolts 72 attached to the cranked pivotally mounted levers 73 which are connected by the link 74. One of said levers 73 is connected by the rod 75 with the hand operated lever 28 in such a manner that when this latter is actuated to admit the compressed air to the parachute the seat 25 is automatically released. Similarly operated releases may be provided in cases where aeroplanes are to be flown upside down to release the parachute from its rest or nesting box.

I may find it advantageous in some cases to construct the cover of the parachute in such a manner as to admit the external air so as to destroy the internal vacuum when the tubular framework is being expanded by the compressed air and one manner of effecting this is illustrated in Fig. 1 where the upper part of the cover 4 is formed with an annular opening 76 the edges of the material of which the cover is made overlapping as will be clearly understood upon reference to the drawings. Tapes 78 may be provided whereby the amount of opening may be regulated.

What I claim is:

1. The combination with a parachute of a collapsible pneumatic framework, means for loosely attaching said framework to said parachute, a valve in the nose of said parachute, means for introducing a fluid under pressure from a reservoir carried by the air craft to said valve to expand said framework, and means for automatically severing the connections between the aircraft and the parachute.

2. The combination with a parachute and a nest box therefor, of a collapsible pneumatic framework loosely attached to said parachute, a reversible valve in the nose of said parachute, a compressed air reservoir, means for introducing air under pressure from said reservoir to said valve to inflate said framework and to expand the parachute, means for introducing air under pressure from said reservoir to said nest box to project the parachute therefrom, a shearing device for the pipe supplying air under pressure to said framework, and means for actuating said shearing device when the parachute reaches its limit of upward movement.

3. The combination with a parachute and a nest box therefor, of an elastic envelop mounted in said nest box to frictionally engage said parachute, means for introducing compressed air to the interior of the parachute and to the nest box, a valve in said nest box and means associated with the parachute for operating said valve to interrupt the supply of air to said nest box when the edge of the parachute is clear thereof.

EVERARD RICHARD CALTHROP.

Witnesses:
E. C. WALKER,
A. E. WHITE.